US008689125B2

(12) United States Patent
Chen et al.

(10) Patent No.: US 8,689,125 B2
(45) Date of Patent: Apr. 1, 2014

(54) SYSTEM AND METHOD FOR AUTOMATIC INFORMATION COMPATIBILITY DETECTION AND PASTING INTERVENTION

(75) Inventors: Yen-Fu Chen, Austin, TX (US); John W. Dunsmoir, Round Rock, TX (US)

(73) Assignee: Google Inc., Mountain View, CA (US)

( * ) Notice: Subject to any disclaimer, the term of this patent is extended or adjusted under 35 U.S.C. 154(b) by 2223 days.

(21) Appl. No.: 10/692,173

(22) Filed: Oct. 23, 2003

(65) Prior Publication Data
US 2005/0091603 A1    Apr. 28, 2005

(51) Int. Cl.
*G06F 3/048*    (2013.01)
*G06F 9/54*    (2006.01)

(52) U.S. Cl.
CPC .............. *G06F 9/543* (2013.01); *G06F 9/544* (2013.01)
USPC .......................................... 715/770; 715/769

(58) Field of Classification Search
CPC .................................. G06F 9/543; G06F 9/544
USPC ..................... 715/724, 769, 512, 523; 706/47
See application file for complete search history.

(56) References Cited

U.S. PATENT DOCUMENTS

| | | | |
|---|---|---|---|
| 4,688,033 A | 8/1987 | Carini et al. | |
| 4,890,247 A | 12/1989 | Sarrine et al. | |
| 5,097,418 A | 3/1992 | Nurse et al. | |
| 5,283,856 A * | 2/1994 | Gross et al. | 706/47 |
| 5,367,623 A | 11/1994 | Iwai et al. | |
| 5,426,583 A | 6/1995 | Uribe-Echebarria Diaz De Mendibil | |
| 5,440,678 A | 8/1995 | Eisen et al. | |
| 5,544,300 A | 8/1996 | Skarbo et al. | |
| 5,579,521 A * | 11/1996 | Shearer et al. | 719/329 |
| 5,583,761 A | 12/1996 | Chou | |
| 5,586,025 A * | 12/1996 | Tsuji et al. | 715/500 |
| 5,590,266 A | 12/1996 | Carson et al. | |
| 5,614,703 A | 3/1997 | Martin et al. | |
| 5,666,552 A | 9/1997 | Greyson et al. | 715/539 |
| 5,678,039 A | 10/1997 | Hinks et al. | |
| 5,706,458 A | 1/1998 | Koppolu | |

(Continued)

FOREIGN PATENT DOCUMENTS

JP    2001250005    9/2001

OTHER PUBLICATIONS

Mark Apperley, Dale Fletcher, Bill Rogers; "Breaking the copy/paste cycle: the stretchable selection tool"; published: 2000.*
TechSmith Corp. "SnagIt User's Guide".

(Continued)

*Primary Examiner* — Haoshian Shih
(74) *Attorney, Agent, or Firm* — Young Basile Hanlon & MacFarlane P.C.

(57) ABSTRACT

Content is transferred from one computer resource to another computer resource by receiving designating a first insertion point, enabling automatic paste operation, switching to a user interface to a source computer resource, receiving a user selection of content from said source user interface, and automatically copying the selected content to a transfer buffer and to the designated insertion point(s) in the destination computer resource. Additional content may be copied to the destination computer resource by simply selecting additional content in the same source computer resource or other computer resources without need to toggle back to the destination user interface between every copy and paste operation. Prior to insertion in the destination computer resource, compatibility of the content is checked, and incompatible elements are handled according to user configured rules, such as converting the elements, converting the elements, or isolating the elements.

18 Claims, 7 Drawing Sheets

(56) References Cited

U.S. PATENT DOCUMENTS

| | | | |
|---|---|---|---|
| 5,765,156 A | 6/1998 | Guzak et al. | |
| 5,781,192 A * | 7/1998 | Kodimer | 715/770 |
| 5,801,693 A | 9/1998 | Bailey | |
| 5,864,830 A | 1/1999 | Armetta et al. | |
| 5,897,643 A | 4/1999 | Matsumoto | |
| 5,897,650 A | 4/1999 | Nakajima et al. | |
| 5,924,099 A | 7/1999 | Guzak et al. | 707/100 |
| 5,929,854 A | 7/1999 | Ross | |
| 5,956,736 A | 9/1999 | Hanson et al. | |
| 5,964,834 A | 10/1999 | Crutcher | |
| 5,974,372 A | 10/1999 | Barnes et al. | |
| 5,995,103 A | 11/1999 | Ashe et al. | |
| 6,023,679 A | 2/2000 | Acebo et al. | |
| 6,032,134 A | 2/2000 | Weissman | |
| 6,044,135 A | 3/2000 | Katz | |
| 6,070,244 A | 5/2000 | Orchier et al. | |
| 6,108,668 A | 8/2000 | Bates et al. | |
| 6,177,939 B1 * | 1/2001 | Blish et al. | 715/770 |
| 6,192,378 B1 | 2/2001 | Abrams et al. | |
| 6,195,420 B1 | 2/2001 | Tognazzini | |
| 6,212,577 B1 * | 4/2001 | Stern et al. | 719/329 |
| 6,236,955 B1 | 5/2001 | Summers | |
| 6,240,430 B1 * | 5/2001 | Deike et al. | 715/210 |
| 6,266,683 B1 | 7/2001 | Yehuda et al. | |
| 6,268,852 B1 | 7/2001 | Lindhorst et al. | |
| 6,272,505 B1 | 8/2001 | De La Huerga | |
| 6,289,330 B1 | 9/2001 | Jannarone | |
| 6,309,305 B1 | 10/2001 | Kraft | |
| 6,313,855 B1 | 11/2001 | Shuping et al. | |
| 6,324,498 B1 * | 11/2001 | Wajda | 703/25 |
| 6,360,205 B1 | 3/2002 | Iyengar et al. | |
| 6,381,567 B1 | 4/2002 | Christensen et al. | |
| 6,401,118 B1 | 6/2002 | Thomas | |
| 6,406,941 B2 | 6/2002 | Tognazzini | |
| 6,449,616 B1 | 9/2002 | Walker et al. | |
| 6,453,268 B1 | 9/2002 | Carney et al. | |
| 6,477,503 B1 | 11/2002 | Mankes | |
| 6,519,631 B1 | 2/2003 | Rosenschein et al. | |
| 6,560,608 B1 * | 5/2003 | Tomm et al. | 707/102 |
| 6,567,973 B1 | 5/2003 | Yamamoto et al. | |
| 6,587,837 B1 | 7/2003 | Spagna et al. | |
| 6,591,094 B1 | 7/2003 | Bentley | |
| 6,735,701 B1 | 5/2004 | Jacobson | |
| 6,773,266 B1 | 8/2004 | Dornbush et al. | |
| 6,789,252 B1 | 9/2004 | Burke et al. | |
| 6,807,668 B2 * | 10/2004 | Stern et al. | 719/329 |
| 6,873,957 B1 | 3/2005 | Chen et al. | |
| 6,891,551 B2 | 5/2005 | Keely et al. | |
| 6,901,367 B1 | 5/2005 | Berstis et al. | |
| 6,993,473 B2 | 1/2006 | Cartus | |
| 7,036,092 B2 | 4/2006 | Sloo et al. | |
| 7,107,206 B1 | 9/2006 | Uchida et al. | |
| 7,167,904 B1 | 1/2007 | Devarajan et al. | |
| 7,171,468 B2 | 1/2007 | Yeung et al. | |
| 7,185,274 B1 | 2/2007 | Rubin et al. | |
| 7,293,242 B2 | 11/2007 | Cossey et al. | |
| 7,310,781 B2 | 12/2007 | Chen et al. | |
| 7,328,166 B1 | 2/2008 | Geoghegan et al. | |
| 7,340,685 B2 | 3/2008 | Chen et al. | |
| 7,346,853 B2 | 3/2008 | Chen | |
| 7,478,336 B2 | 1/2009 | Chen et al. | |
| 7,496,230 B2 | 2/2009 | Chen | |
| 7,503,012 B2 | 3/2009 | Chen | |
| 2001/0016825 A1 | 8/2001 | Pugliese, III et al. | |
| 2001/0049613 A1 | 12/2001 | Gramann, III et al. | |
| 2002/0002452 A1 | 1/2002 | Christy et al. | |
| 2002/0052893 A1 | 5/2002 | Grobler et al. | |
| 2002/0054092 A1 | 5/2002 | Hedloy | |
| 2002/0082877 A1 | 6/2002 | Schiff et al. | |
| 2002/0156672 A1 | 10/2002 | Burko | |
| 2002/0165862 A1 | 11/2002 | Richards et al. | |
| 2002/0186255 A1 | 12/2002 | Shafron et al. | |
| 2002/0188670 A1 | 12/2002 | Stringham | |
| 2003/0004760 A1 | 1/2003 | Schiff et al. | |
| 2003/0007007 A1 | 1/2003 | Hinegardner et al. | |
| 2003/0036929 A1 | 2/2003 | Vaughan et al. | |
| 2003/0040900 A1 | 2/2003 | D'Agostini | |
| 2003/0061145 A1 | 3/2003 | Norrid | |
| 2003/0125927 A1 | 7/2003 | Seme | |
| 2003/0135476 A1 * | 7/2003 | Holland et al. | 706/47 |
| 2003/0200078 A1 | 10/2003 | Luo et al. | |
| 2004/0027382 A1 * | 2/2004 | Kuehn et al. | 345/769 |
| 2004/0039995 A1 | 2/2004 | Kuwata et al. | |
| 2004/0150215 A1 | 8/2004 | King | |
| 2004/0181753 A1 * | 9/2004 | Michaelides | 715/523 |
| 2004/0205493 A1 | 10/2004 | Simpson et al. | |
| 2004/0250215 A1 | 12/2004 | Chen et al. | |
| 2004/0257346 A1 | 12/2004 | Ong et al. | |
| 2004/0267823 A1 | 12/2004 | Shapiro et al. | |
| 2005/0102630 A1 | 5/2005 | Chen | |
| 2005/0132280 A1 | 6/2005 | Broman et al. | |
| 2005/0155017 A1 | 7/2005 | Berstis et al. | |
| 2006/0224903 A1 | 10/2006 | Ginter et al. | |
| 2006/0253330 A1 | 11/2006 | Maggio et al. | |
| 2006/0282319 A1 | 12/2006 | Maggio | |
| 2008/0098317 A1 | 4/2008 | Chen | |
| 2009/0031238 A1 | 1/2009 | Berstis et al. | |
| 2009/0044140 A1 | 2/2009 | Chen et al. | |

OTHER PUBLICATIONS

USPTO, Image File Wrapper containing Office Actions, Applicant REplies/Amendments and Information Disclosure Statements in U.S. Appl. No. 10/703,018, filed on Nov. 6, 2003, allowed on Sep. 1, 2009, 281 pages.

USPTO; recent notice of allowance in related U.S. Appl. No. 12/245,279; filed on Oct. 3, 2008, by Viktors Berstis.

Miller et al.; "Syncrhonizing Clipboards of Multiple Computers", ACM, 1999, vol. 1.1, pp. 65-66.

Akers; "LogMedia Translate Version 2.0"; 2002; pp. 220-223.

USPTO; notice of allowance in related U.S.Appl. No. 12/245,279, filed on Nov. 29, 2007 by Viktors Berstis.

University of Kentucky, WS.sub.—FPT Quick REference Guide, Apr. 3, 2000, http://www.uky.edu/SCS/documents/Win-wsftp/win-wsftppf.html.

John Kaufeld, Access 97 For Windows For Dummies, Copyright (c) 1996, IDG Books Worldwide, Inc. pp. 24, 68, 77, 82, 89, 299, 300.

IBM Technical Disclosure Bulletin "Multiple Item On-line Clipboard", Jul. 1992, p. 425.

File Buzz, "Clipboard Magic v4.01", retrieved on Apr. 7, 2008 from http://www.filebuzz.com/fileinfo/317/Clipboard.sub.—Magic.html, 2 pages (please note copyright date at bottom of second page).

Cybermatrix, "Clipboard Magic [TM]: Free Multiple Storage Clipboard Utility", Version 4.01, retrieved on Apr. 7, 2008 from http://www.cybermatrix.com/clipboard.sub.—magic.html, 3 pages (please note "version history" link in Product Quick Links box, upper right portion of first page).

Courter, et al. Mastering Microsoft Office 2000 Professional Edition, (c) 1999, SYBEX, pp. 35,37.

USPTO; recent examination correspondence in related U.S. Appl. No. 11/947,350, filed on Nov. 29, 2007 by Yen-Fu Chen.

USPTO; Examination Correspondence from a Related U.S. Appl. No. 12/192,391; filed on Aug. 15, 2011 by Yen-Fu Chen.

USPTO; first office action in related U.S. Appl. No. 12/251,567, filed on Oct. 15, 2008 by Yen-Fu Chew.

Berstis, Viktors; recently filed terminal disclaimers in related U.S. Appl. No. 12/245,403, which was filed on Oct. 3, 2008 by Viktors Berstis.

Chen, Yen-Fu; recent petition to withdraw from issue submitted on Sep. 26, 2011 in related U.S. Appl. No. 11/971,813, filing date of Dec. 20, 2007 by Yen-Fu Chen, et al.

USPTO; recent Notice of Allowance in related U.S.Appl. No. 12/245,279, filed on Oct. 3, 2008 by Viktors Berstis.

USPTO; decision granting petition to withdraw from issue after payment of an issue fee in order to have an Information Disclosure Statement considered mailed on Sep. 27, 2011 in related U.S. Appl. No. 11/961,813, filed on Dec. 20, 2007, Yen-Fu Chen, et al.

USPTO; recent examination correspondence in related U.S. Appl. No. 11/961,813, filed on Dec. 20, 2007 by Yen-Fu Chen.

USPTO; notice of allowance in related U.S. Appl. No. 11/947,350, filed on Nov. 29, 2007 by Yen-Fu Chen.

(56) References Cited

OTHER PUBLICATIONS

USPTO; recent examination correspondence in related U.S. Appl. No. 12/245,403, filed on Oct. 3, 2008, byt Viktors Berstis.

USPTO; recent examination correspondence including Notice of Allowance and Rule 312 Amendment in related U.S. Appl. No. 12/245,279, filed by Viktors Berstis on Oct. 3, 2008.

* cited by examiner

SYSTEM AND METHOD FOR AUTOMATIC INFORMATION COMPATIBILITY DETECTION AND PASTING INTERVENTION

CROSS-REFERENCE TO RELATED APPLICATIONS (CLAIMING BENEFIT UNDER 35 U.S.C. 120)

This application is related to U.S. patent application Ser. No. 10/455,159, filed on Jun. 5, 2003, by Yen-Fu Chen.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related patent application, U.S. patent application Ser. No. 10/455,159, filed on Jun. 5, 2003, by Yen-Fu Chen, is incorporated by reference, in its entirety including figures, to the present patent application

BACKGROUND OF THE INVENTION

1. Field of the Invention

This invention relates to the arts of computer user interfaces and data exchange between program entities such as instances of programs in a multi-tasking computer system. This invention relates especially to computer methods for transferring information from one file to another.

2. Background of the Invention

Modern multi-tasking computers provide a variety of user interfaces for controlling multiple application programs and system functions which operate simultaneously. Some of the most widely used multi-tasking computer systems are personal computers ("PC") running a multi-tasking operating system ("OS") such as International Business Machines' ("IBM") OS/2™ or AIX™, Microsoft Windows™, and Apple Computer's MacOS™. Other operating systems may be used with personal computers as well as larger computers such as enterprise-class computers, such as UNIX, Sun Microsystems' Solaris™, Hewlett Packard's HP-UX™, and the "open sourced" LINUX. Smaller computing platforms such as held-held computers, personal digital assistants ("PDA"), and advanced wireless telephones may run operating systems targeted for such hardware including Palm Computing's PalmOS™ and Microsoft's Windows CE™. Additionally, there are many "proprietary" and less widely-used computing platforms and operating systems which also allow users to control and run multiple programs and system functions simultaneously.

Many of these systems will use tabs, icons, windows, frames, pages and special key combinations to allow a user to switch between user interfaces ("UI") for each program and system function which is being executed, or to start or stop the execution of a program or system function. For example, in a personal computer running MS Windows™, the user may first start a web browser program running using several methods (e.g. double clicking an icon on the desktop, selecting the program from a Start Programs list, operating a "hot key", etc.), and then may start a document editor program using similar methods. Each program establishes a user interface such as its own "window". The user can then control a program by selecting its window using one of several available methods, such as selecting a button or icon on a command bar, activating a "task list" and selecting a program, etc. As a result, a user can start and run many programs simultaneously, periodically switching between their user interfaces to accomplish work or entertainment tasks as needed. Other computing systems provide similar basic user control capabilities, albeit with a variety of user controls to switch between programs and system functions.

Users often wish to copy or transfer information or "content" from one program or system function to another. For example, a user may be preparing an invoice for a client using a word processor program, but may also be simultaneously using a database or spreadsheet program to perform various calculations. Using "copy and paste" functions of the application programs and the operating system, the user may select information from a source program (e.g. the spreadsheet), and "paste" it into the destination program (e.g. the invoice being edited). Such a process is so common place in computer users' daily lives that it is rote, albeit each user may know several sequences of actions for several computers which he or she commonly uses (e.g. one process on his home PC, another on his PDA, and another on his networked terminal at work). These memorized methods may typically include several steps of clicking on icons, dropping down lists, highlighting information, and using navigation controls within program UI's.

For example, turning to FIG. 1, a "windows" style user interface is depicted to illustrate a process of "copying" information from a web browser program to a word processor file via a "clipboard" memory. In this system, each program provides a window (2, 3, 104) which can be closed (9, 9') to end the program, maximized (8, 8') to view the full UI for that program, or minimized (7, 7') to leave the program running but deactivate the UI (e.g. clear the UI window from the screen). In this example, these controls are located in a command bar (4, 4') along the top of the UI window, but many other variations are known in the art.

Each UI window also typically has navigation controls such as left panning (15, 15'), right panning (13, 13'), and horizontal scroll (14, 14') controls, as well as up panning (10, 10'), down panning (12, 12'), and vertical scroll (11, 11'), for viewing areas of information and content not completely viewable in the UI. Information, icons, text, graphics, etc., are shown or displayed within (16, 18) the UI window according to the scroll and panning control settings. More recently, the term "content" (16, 18) has been used to collectively refer to all types of information which may be displayed or presented in a user interface, including but not limited to text, graphics, still images, animated images, video, audio, and hyperlinks.

Now suppose for the purpose of our example, the user has started a word processing program which provides a first UI window (2), and a web browser which provides a second UI window (3). Also suppose that the user is researching information on the Internet using the web browser while authoring a paper which is being edited simultaneously using the word processor.

In this example, the user has found information (19) at a hypothetical web address (17) that he wants to "quote" in his or her paper. So, the user must first move the cursor (104) in the word processor to select an insertion point for the information, then must switch to the web browser UI, select the text (19) in the source content, operate a "copy" command in the web browser UI which copies (101) the content into a buffer (100) such as a "clipboard", switch back to the word processor UI, and operate a "paste" or "insert" command, which results in the copied content (19) being inserted into the destination document at the point of insertion (103). The user can repeat this process for many different program UI's (106).

In some software and hardware configurations, the copy buffer may be provided within a suite of application programs which are "tightly coupled" or related. Such suites cooperate with each other in ways not possible with software programs provided by differing suppliers. In many cases, however, the operating system provides a buffer function which is generally accessible by all programs, such as the clipboard in the MS Windows™ operating system.

Also, in some situations, the original content with its original format may not be acceptable by the destination program, and as such, a specialized paste or insertion function (105) may be provided by the destination program or operating system which converts the content to a form useful by the destination program. For example, text copied from a web page may include color, size, font, style, and hyperlink reference information embedded in the base Hyper Text Markup Language ("HTML") of the source web page. However, not all word processors are able to interpret all of these special codes and identifiers, so a "paste as plain text" option may be provided by a converter or translator (105) function.

So, to illustrate the complexity and tedious nature of such ordinary operations, we present the steps in full to accomplish this example scenario of simply transferring a block of formatted text from a web page to a word processor program, starting from a point where the user is editing the destination document in the word processor:

(a) navigate to the insertion point in the destination document using the word processor UI window controls (e.g. multiple clicks on scroll, panning or page up/page down keys);

(b) optionally select text or content in the destination document which is to be replaced;

(c) switch to the web browser UI window (e.g. click on an icon in a task bar, activate a task list and pick a running web browser program, etc.);

(d) navigate in the web browser UI window to find the text or content desired to be transferred into the document (e.g. use panning, scrolling, or page up/page down keys);

(e) select the source content or text (e.g. click-and-drag over the content to highlight it)

(f) transfer the content to a copy buffer (e.g. click on "Edit" command, select "copy" option or type Alt-E, Alt-C);

(g) switch back to the word processor UI window (e.g. (e.g. click on a icon in a task bar, activate a task list and pick a running web browser program, etc.); and (h) operate a "paste" command in the word processor UI window (e.g. click on "Edit" command, select "paste" option or type Alt-E, Alt-P).

Each of these operations may actually require several steps (clicking, scrolling, selecting, typing, etc.), so this minimal process may represent 7 to 25 actual user actions. This process must be repeated for each block of text or content to be transferred from multiple program UI windows (106), and additional steps may be necessary to achieve a "special paste", as described above. Also, if the same text or content is to be inserted into the destination document for file at multiple locations, the last few operations of this process (h) in addition to some navigation actions must by performed by the user.

As a result, consolidating information from multiple sources of information may be extremely tedious, frustrating, and tiresome using the currently available methods and apparatuses provided in such computing systems. Some systems may provide notably more "user friendly" or intuitive methods, while other systems are much more difficult and "clunky" to use.

Turning to FIG. 2, this process is generalized. Starting at a point or time (21) when the user is actively working with the destination program UI, the user must navigate (22) within the present document, file, or other computer resource to a point where the content insertion is to be made, including selecting any content which is to be replaced. Then, the user must switch (23) to the UI of the first source of information, navigate (24) to the first source content to be transferred, select that content, and operate (25) a copy or cut control in the first source UI.

Next, the user must switch (26) back to the destination UI, and operate (27) an insert or paste command in that UI. If (28) the user wants to insert or paste that content into multiple destinations, the user must navigate (29) to each destination and operate (27) the paste or insert command in the destination program UI, until all insertions have been made for that source information.

If (200) the user desires to transfer information from other points in the same source, or from other sources, the user must repeatedly switch (201) to a source UI, navigate to a source content point, select source information, operate (25) a copy or cut operation, switch (26) back to the destination UI, and paste or insert (27) the content, until all information has been transferred.

Implied, but not shown in detail, in this generalization of the process can be multiple user actions for each general step. Optionally, options such as conversion of the content may be necessary, which requires additional user actions (e.g. the "paste as plain text" example).

So, it is not inconceivable that in the course of authoring a paper using a word processor and information from several sources, the user may have to perform hundreds of tedious actions, commands, selections, navigation operations, etc.

In this paradigm, certain conventions have evolved into place which only moderately simplify or reduce the burden of such operations. For example, performing a "cut" operation usually deletes the selected source content from the source file, and places a copy of it into the transfer buffer, sometimes overwriting the current contents of the transfer buffer. A "copy" operation typically leaves the selected information unchanged in the source and only places a copy of the information in the transfer buffer. Additionally, in the destination UI, a "paste" or "insert" command may copy the contents of transfer buffer to a selected point in the destination document or file, leaving a copy in the transfer buffer for additional pastes or insertions.

In some programs, a "paste special", "import from clipboard", or similar command may be available with several conversion options to perform a minimal conversion process on each transfer. However, even though the user may be performing the same "paste special" command over and over, the typical UI does not memorize or "learn" this process, so the user is forced to respond to a number of redundant options and dialogs on each paste operation.

The same user interface conventions are followed by many computer systems not only for content or information within a computer resource such as text and graphics within a file, but also for resources (e.g. files, shortcuts, icons, mappings, etc.) within a computing environment (e.g. file system, directories, folders, etc.). For example, when working with a MS Windows™ operating system and running the Windows Explorer program, a user may select a file, directory or folder to move, execute an "Edit-Cut" command sequence, navigate to another directory or drive, and execute an "Edit-Paste" command to move the selected resource to the new destination. Similarly, by selecting the source resource, executing a copy command, and then executing a paste command to one or more destinations, the original resource is not changed but copies of it are deposited at the destination points. Further, by selecting and copying a source resource, then selecting a destination resource, replacement of the destination resource may be accomplished.

The invention described in the related patent application entitled "System and Method for Content and Information Transfer Between Program Entities", filed by Yen-Fu Chen, et al., and incorporated herein, addressed this problem to a large degree. The related invention enables users to preselect or pre-designate one or more destination content area(s) or points, and then to only perform the highlighting action in the source files or documents to produce copy/paste results without any additional mouse clicks or touching the keyboard.

According to one aspect of the related invention, the user initially designates one or more insertion points or replacement areas for receiving transferred content in a destination UI, then switches to a source UI, highlights content to be transferred, and the system performs the copy or paste operation without any additional user action, including any conversion as may be necessary.

Then, the user may simply navigate to another point in the same source, or switch to another source UI, select content, and it will be "pasted" automatically into the destination without the user having to switch back to the destination UI or perform any additional paste or insert command actions.

However, as source information may or may not be completely compatible with destination environment, the user, even when using the related invention, may be required to make certain tedious and inconvenient operations to perform the information transfer usefully.

For example, consider a situation where the source information is a graphically rich section of a web page, including text and color photographs. Further assume for the purposes of this example that the color photographs are stored in the source document as Joint Photographic Experts Group ("JPEG") format data objects. If the user attempts to transfer this selected information (e.g. text+photograph) to a destination which does not support JPEG photographs, such as a text-only editor, a problem may arise that cannot be completely handled by the related invention—e.g. what to do with the photograph. In some other cases, destination editor may be able to handle other format images, such as Graphic Interface File ("GIF") images, but not JPEG images.

The user may, after realizing this and with sufficient technical expertise, find a way to export the image and save it to a separate file, use another tool to convert the JPEG image to a GIF image, and then use the related invention to transfer the GIF image to the destination document. This process, however, requires the user to have the expertise necessary to make such an export and conversion, as well as to have the extra tool to perform the conversion. Further, if this is a task to be repeated often, such as cutting and pasting a considerable amount of information in this manner, it becomes tedious, tiresome, and error-prone.

Therefore, there is a need in the art for a system and method to provide a configurable automatic source-to-destination compatibility detection and conversion system and method for transferring information from one or more source environments to a destination environment.

SUMMARY OF THE INVENTION

The existing approaches for transferring information and content between multi-tasked programs in a computer system can certainly create confusion, are tedious, time consuming, and frustrating. The present invention enables users to preselect or pre-designate one or more destination content area(s) or points, and then to only perform the highlighting action in the source files or documents to produce copy/paste results without any additional mouse clicks or touching the keyboard.

Additionally, the present invention automatically intercepts the transfer of the information to the destination, detects information compatibility during information transfer (e.g. during a "pasting from buffer" operation"), determining if the information is compatible with the destination document, environment, or data construct. If the information is not compatible, the transfer is suspended, and the user is provided an opportunity to define a new rule, process, or macro regarding how to handle the incompatible information. Options include invoking a converter or translator, if one is available on the present system. Another option is to export the incompatible information to a separate data construct such as a separate file, and to provide a note or annotation in the destination file as to the removal of the information and its final location.

BRIEF DESCRIPTION OF THE DRAWINGS

The following detailed description when taken in conjunction with the figures presented herein provide a complete disclosure of the invention.

DESCRIPTION OF THE INVENTION

Figure 1:
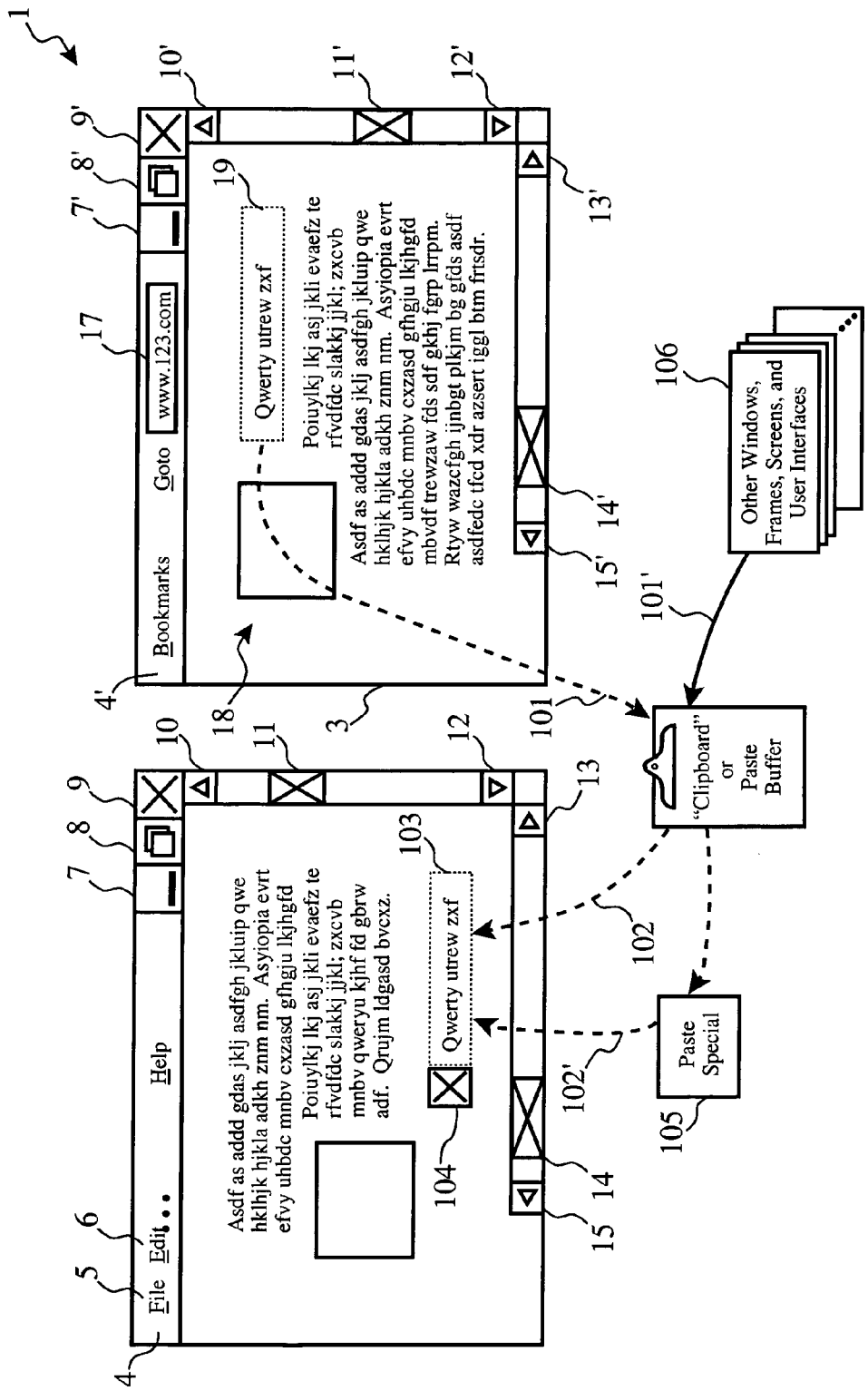
FIG. 1 illustrates the typical user interfaces and system actions of "cutting and pasting" information from one application program to another.
Figure 2:
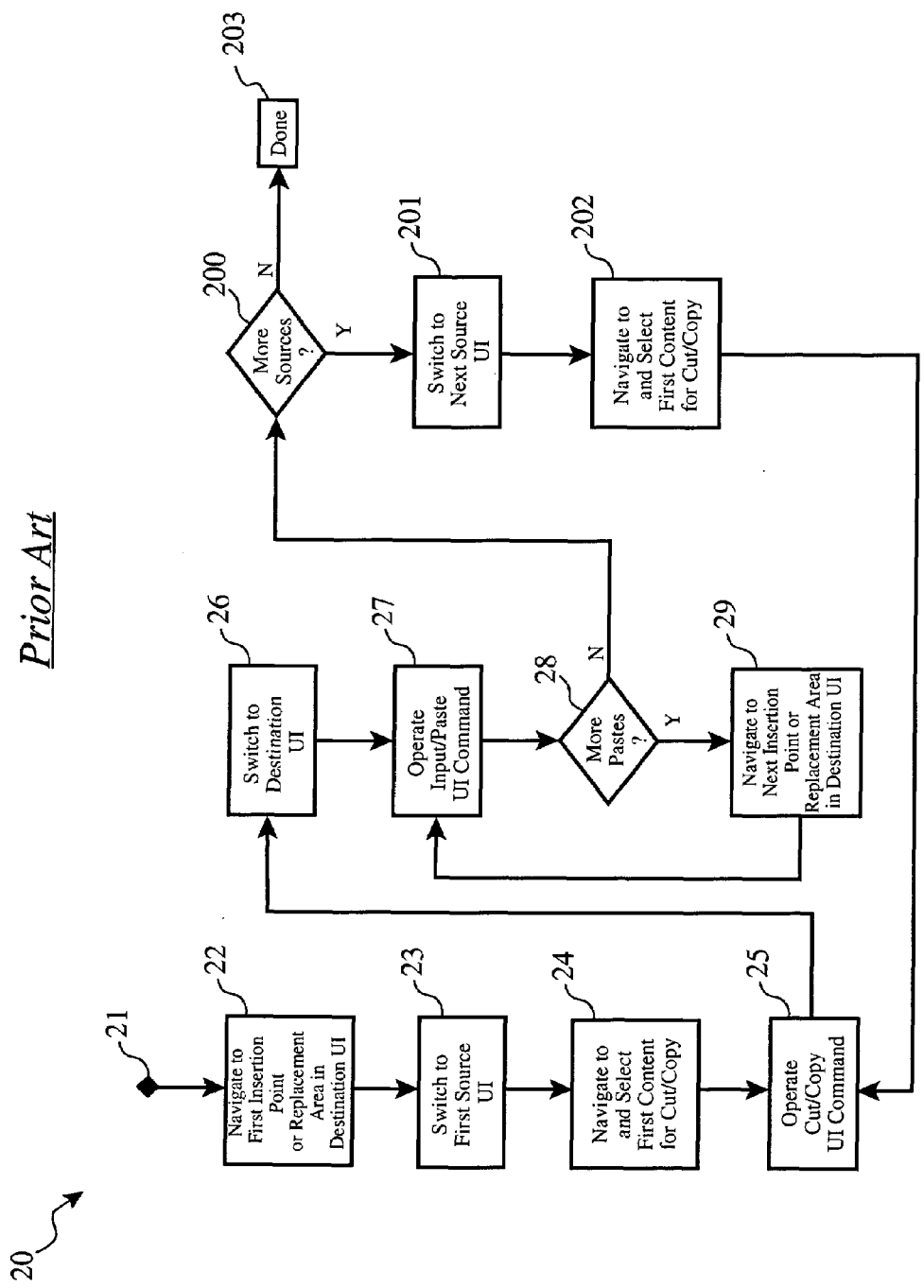
FIG. 2 shows the typical logical process in a general manner for transferring content from one application program or system function to another.

The present invention is preferably realized as an enhancement of the related invention, but may be alternately realized in some embodiments as a stand alone tool or as an improvement to other products and application program. As such, the present invention will be described in detail relative to the details of the related invention. It is within the skill of those in the art to adapt the present invention to other embodiments, when provided with the description contained herein.

According to one aspect of the invention, the user initially designates one or more insertion points or replacement areas for receiving transferred content in a destination UI, then switches to a source UI, highlights content to be transferred, and the system performs the copy or paste operation without any additional user action, including any conversion as may be necessary.

Then, the user may simply navigate to another point in the same source, or switch to another source UI, select content, and it will be "pasted" automatically into the destination without the user having to switch back to the destination UI or perform any additional paste or insert command actions.

The information contained in the transfer buffer may be concatenated as source selection operations are made instead of replacing the contents of the buffer, such that a user may "collect up" information from multiple source points before a single insertion or paste is made Content and information conversion rules may be established, either by the programs themselves, by the user, or by both, which will control the automatic conversion of the information from one format to another prior to inserting it into the destination file or document. Using these rules, the invention automatically detects when part or all of content being pasted is incompatible with the destination document, file or data construct. This invokes a user interface which allows the user to establish a new rule for conversion or handling of the incompatible content, if no handling rule exists. For future translations of similar information, the invention can then handle the conversion or handling of the information automatically according to the user's established rules.

Suitable Computing Platforms

The present invention is preferably realized as computer-executable code such as compiled software, scripts, or portable programs, in conjunction with existing application programs, operating systems, and computer hardware. For purposes of completeness, we first present a generalized view in FIGS. 3 and 4 of typical computer hardware and software which is suitable for realization of our invention. Many variations of these computer platform details may be made without departing from the scope of the invention, as will be readily recognized by those skilled in the art.

Common computing platforms such as personal computers, web servers, and web browsers, as well as proprietary computing platforms, may be used in realization of the present invention. These common computing platforms can include, but are not limited to, personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 3:
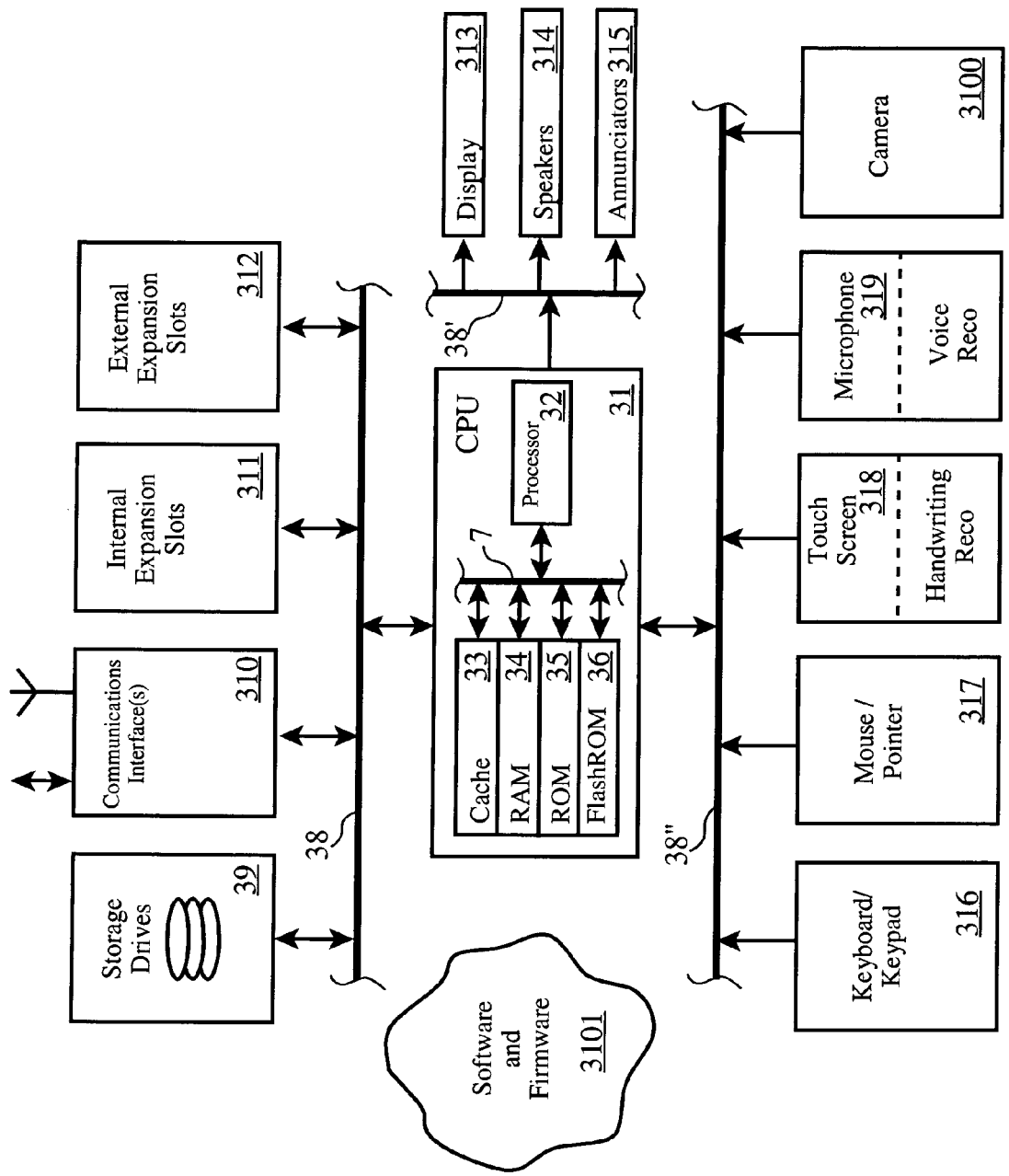
FIG. 3 depicts a generalized computing platform architecture, such as a personal computer, server computer, personal digital assistant, web-enabled wireless telephone, or other processor-based device.

Turning to FIG. 3, a generalized architecture is presented including a central processing unit (31) ("CPU"), which is typically comprised of a microprocessor (32) associated with random access memory ("RAM") (34) and read-only memory ("ROM") (35). Often, the CPU (31) is also provided with cache memory (33) and programmable FlashROM (36). The interface (37) between the microprocessor (32) and the various types of CPU memory is often referred to as a "local bus", but also may be a more generic or industry standard bus.

Many computing platforms are also provided with one or more storage drives (39), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (310), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (311), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (312) allowing the user the ability to easily install and remove hardware expansion devices, such as PCMCIA cards, SmartMedia cards, and various proprietary modules such as removable hard drives, CD drives, and floppy drives.

Often, the storage drives (39), communication interfaces (310), internal expansion slots (311) and external expansion slots (312) are interconnected with the CPU (31) via a standard or industry open bus architecture (38), such as ISA, EISA, or PCI. In many cases, the bus (38) may be of a proprietary design.

A computing platform is usually provided with one or more user input devices, such as a keyboard or a keypad (316), and mouse or pointer device (317), and/or a touch-screen display (318). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (318) is usually provided, often with handwriting recognition capabilities.

Additionally, a microphone (319), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (3100), such as a still digital camera or full motion video digital camera.

One or more user output devices, such as a display (313), are also provided with most computing platforms. The display (313) may take many forms, including a Cathode Ray Tube ("CRT"), a Thin Flat Transistor ("TFT") array, or a simple set of light emitting diodes ("LED") or liquid crystal display ("LCD") indicators.

One or more speakers (314) and/or annunciators (315) are often associated with computing platforms, too. The speakers (314) may be used to reproduce audio and music, such as the speaker of a wireless telephone or the speakers of a personal computer. Annunciators (315) may take the form of simple beep emitters or buzzers, commonly found on certain devices such as PDAs and PIMs.

These user input and output devices may be directly interconnected (38', 38") to the CPU (31) via a proprietary bus structure and/or interfaces, or they may be interconnected through one or more industry open buses such as ISA, EISA, PCI, etc.

The computing platform is also provided with one or more software and firmware (3101) programs to implement the desired functionality of the computing platforms.

Figure 4:
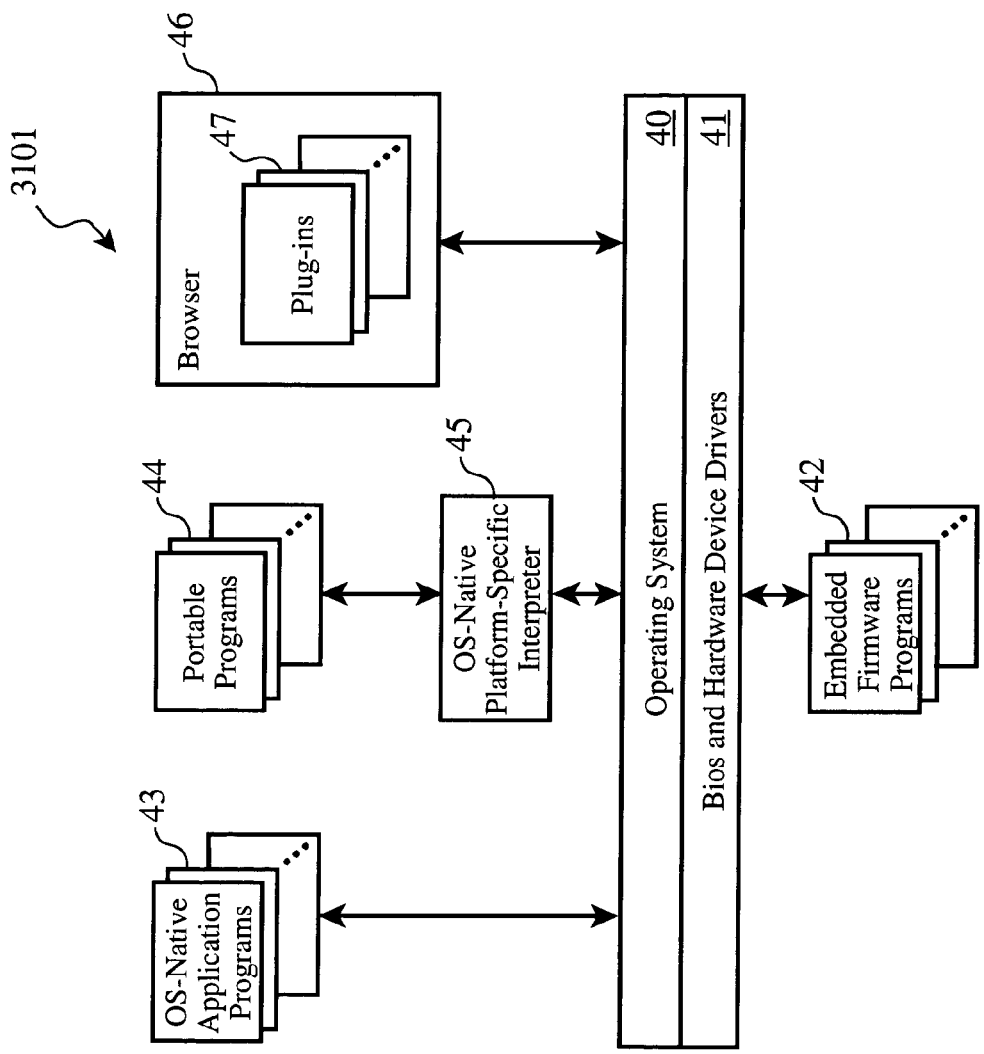
FIG. 4 shows a generalized organization of software and firmware associated with the generalized architecture of FIG. 1.

Turning to now FIG. 4, more detail is given of a generalized organization of software and firmware (3101) on this range of computing platforms. One or more operating system ("OS") native application programs (43) may be provided on the computing platform, such as word processors, spreadsheets, contact management utilities, address book, calendar, email client, presentation, financial and bookkeeping programs.

Additionally, one or more "portable" or device-independent programs (44) may be provided, which must be interpreted by an OS-native platform-specific interpreter (45), such as Java™ scripts and programs.

Often, computing platforms are also provided with a form of web browser or microbrowser (46), which may also include one or more extensions to the browser such as browser plug-ins (47).

The computing device is often provided with an operating system (40), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (41) are often provided to allow the operating system (40) and programs to interface to and control the specific hardware functions provided with the computing platform.

Additionally, one or more embedded firmware programs (42) are commonly provided with many computing platforms, which are executed by onboard or "embedded" microprocessors as part of the peripheral device, such as a micro controller or a hard drive, a communication processor, network interface card, or sound or graphics card.

As such, FIGS. 3 and 4 describe in a general sense the various hardware components, software and firmware programs of a wide variety of computing platforms, including but not limited to personal computers, PDAs, PIMs, web-enabled telephones, and other appliances such as WebTV™ units.

Logical Processes of the Invention

We now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

In general, the present invention provides the user the ability to follow this process:

1. Declare destination content area for pasting or insertion in a destination UI;
2. Enable highlighting or selecting content to automatic copy selected information and store it in memory (e.g. buffer/clipboard) for future usage, as well as to automatically insert or paste the selected information into the pre-designated destination area;
3. Switch to source UI's, and simply highlight or select the desired content portion(s) which triggers dynamic insertion/concatenation into the declared content field.
4. Receive an automatic notification that a portion of the highlighted source information is not compatible with the destination; and
5. Define new rule or process for handling the incompatible content such as conversion, isolation and annotation, such that future similar situations are handled automatically according to the user's preferences.

Using the present invention, advantages over presently available methods and user interfaces are:

1. User-friendly: the invention utilizes maneuvering techniques with which users are already familiar, such as double mouse clicks, dragging to highlight, etc.;
2. Convenient: the invention provides a user a new way of selecting destination for paste operations, and offers a quicker way of copy/paste by eliminating keyboard strokes, mouse clicks, navigation and toggling between different program windows and UI's.
3. Intuitive: Users can learn or "discover" that in this new mode, content highlighting triggers copy/paste effortlessly, immediately seeing the results of the highlighting action, and proceeding to experiment with various ways of applying and exploring this invention.
4. Time-Saving: Reduces time to compile information from multiple sources by making copy-paste user interface methods much more efficient.
5. Increases productivity: By reducing fatigue and tediousness in application program user interfaces, users are allowed to produce more accurate results with less effort in less time.

Figure 5:
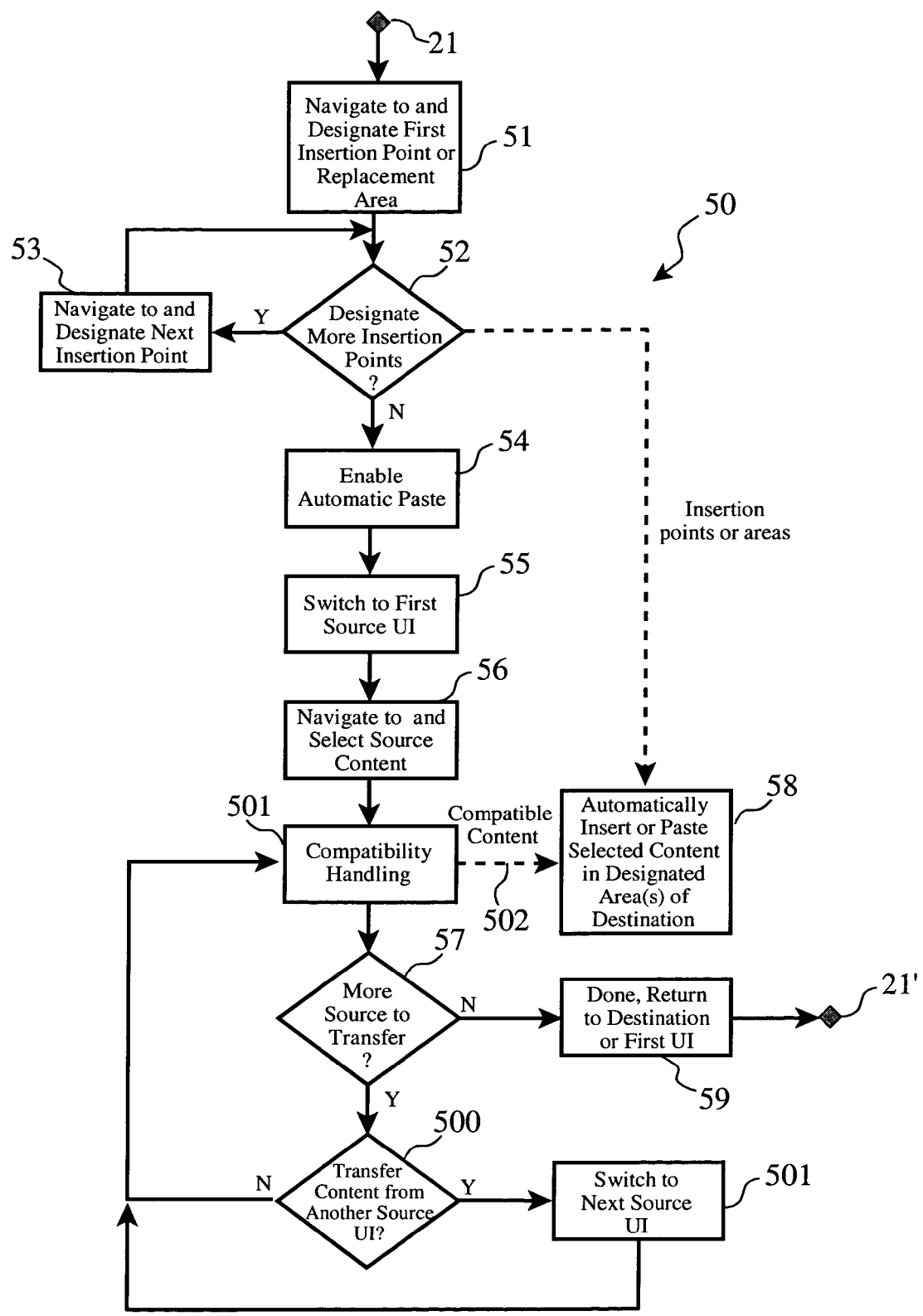
FIG. 5 illustrates the logical method of the present invention.

Turning to FIG. 5, a first logical process of the invention is shown at a high level. This method may be implemented as compiled code, scripts, or interpretable code (e.g. Java, applets, servlets, etc.) in full or part within application programs, operating systems, server suites, utility programs, or proprietary code or hardware.

While (21) creating or editing a computer resource such as a computer file or document, when a user wishes to insert or copy content from a source destination to the resource being edited, the user may execute the method (50) shown. The source or sources may include points and areas within UI's of other programs and system functions, as well as within the destination resource which is being created or edited.

Initially, the user may navigate (51) to a first insertion point and optionally highlight an insertion area to designate a first "paste" destination while in the current (destination) UI. If (52) more than one insertion points or areas are desired, the user may navigate to and select (53) additional destinations while still in the destination UI. Insertion points can be marked in a variety of ways, including placement of a graphical icon such as a caret ("^") at the insertion point(s) or other suitable icon. Replacement destination areas can be marked in a variety of ways, including highlighting the selected text, graphics, information, or content in a special pattern, color, or both, or by making special changes to the selected information itself (e.g. changing the text to a different color, underlining the text, etc.). Preferably, a user interface or dialog box is also provided to allow the user to manage destination insertion points and replacement areas, such as to create additional points and areas, and to remove points and areas.

When all destination points and areas have been designated, the user enables (54) the automatic content transfer function of the invention through an appropriate user control such as right-clicking with the mouse to bring up a dialog box, selecting an option from a drop-down list, or operating a special icon, key or key sequence. The user may be allowed to select advanced options, such as rules for concatenation or content conversion, or whether cutting (e.g. source deletion) is performed as well as copying on each subsequent selection operation.

Next, the user switches (55) to the first UI from which source information is to be transferred, navigates to the first source point, and highlights or selects (56) source content.

Compatibility handling is performed (501), described in more detail in the following paragraphs, and the compatible information is then automatically copied into the transfer buffer, and subsequently pasted (58) into the designated destination point(s) and area(s), without need to switch back to the destination UI.

If (57) more source content is to be transferred, the user may continue to navigate to additional points and to select (56) additional content for automatic pasting into the destination resource from within the current UI, or the user may switch (500, 501) to another UI and proceed with selecting (56) for automatic pasting (58) into the destination resource.

If the concatenation option is selected, upon selection of a content block or area, it is appended to the existing contents of the transfer buffer, and the user is given the option to perform the automatic pasting into the destination point(s) and area(s), without need to switch back to the destination UI.

If the source cutting operation is selected, upon selection of a content block or area, it is deleted from the source resource (assuming the user has the rights to modify the resource), placed in the transfer buffer, and pasted, concatenated or converted as determined by the other options.

When (57) all source information has been copied, the information transfer operation is complete (59), and the user returns to the initial (e.g. destination) UI to continue editing or creating (21') the computer resource.

As an example and comparison now between the user control method typically employed and the user control method provided by the present invention, we present the following case. On a MS Windows™ operating system, a user who has several windows opened intends to compose an email using a web based mail program. Further, the user plans to generate the content of this email from the other opened windows by using the copy/paste functions, specifically from Microsoft Word™ word processor and from Lotus Notes™ application programs. Suppose that the email message is to be created from a paragraph in MS Word and another from Lotus Notes respectively. So, traditionally what the user would be required to do in order to accomplish this task in the shortest time frame is the following:

1. open the email composer window;
2. switch to the window for MS Word using Alt-Tab;
3. highlight the desired text in the MS Word document;
4. hit Ctrl-C to copy the selected text into the clipboard;
5. hit Alt-Tab until toggled to the email composer window;
6. click on the text area or point where the copied paragraph is to be placed;
7. hit Ctrl-V or select Edit-Paste to insert the text copied from MS Word;
8. switch to the Lotus Notes window using Alt-Tab;
9. highlight or select the desired text in Notes;
10. hit Ctrl-C to copy the text to the clipboard;
11. hit Alt-Tab to switch back to the email composer window;
12. place the cursor on the end of the first inserted paragraph;
13. hit Ctrl-V or select Edit-Paste with the mouse or keyboard to append text from the Notes window to the initially inserted content; and
14. switch back to the email composer window using Alt-Tab.

Using the invention, the method is shortened significantly to achieve identical result without ever having to touch the keyboard:

1. open the email composer window, place cursor at desired insertion point;
2. enable auto-pasting and designate an insertion point or replacement area (e.g. by right clicking in the email text area or by double clicking on the left mouse button while in the email message text area), selecting an auto-paste option (assume no concatenation, no conversion and cutting options are selected)
3. switch to the MS Word window using Alt-Tab;
4. highlight the first block of desired text causing the selected text to be automatically inserted in the email composer window;
5. switch to the Lotus Notes window using Alt-Tab;
6. highlight the second block desired text causing the selected text to be automatically inserted in the email composer window following the first block; and
7. switch back to the email composer window using Alt-Tab.

There are alternative implementations available to declare destination context area. For example, consider the situation where the email message is created from many windows or many sections of a few windows, the number of toggles between program windows and highlighting/Ctrl-C/Ctrl-V operations could cause intense frustration and stress on the user. In systems running operating system which are not completely stable, such window or frame switching may also increase the possibility of an OS lock up or crash.

Similar to the email example, this invention can be used by helpdesk agents filling out problem descriptions from known issues or solutions, users completing a form based on known information (creating resume, registration, etc.), and even programmer and software testers attempting to write new code or test cases by using a template or reusing available code.

There are plentiful situations where an efficient way of copying content and inserting it into one or more desired locations can significantly improve productivity, save time, reduce overall operational cost, and radically increase user satisfaction.

In an alternate embodiment of the present invention, each selection of source content may be followed by addition of a specified delimiter between the next selection of source content. For example, in the email composition scenario previously discussed, a delimiter such as a space, carriage return, HTML horizontal line, or text note may be automatically added between the MS Word paragraph and the Lotus Notes paragraph. In a first advanced implementation of this option, a descriptive annotation may be appended before or after the content, such as:

<copied from MS Word: c:\my_files\document.doc> and:

<copied from Lotus Notes:
    e:\network_backups\advice.lwp>

These notations can include web site addresses, as well, and optionally time and date information:

<copied from www.help.ibm.com\laptops\upgrades on
    3-15-2003>

Alternate embodiments of this notation include, but are not limited to, annotations made in eXtensible Markup Language ("XML"), and possibly including a time stamp such as a local clock and calendar value, or a Coordinated Universal Time ("UTC") value.

According to another alternative aspect of the present invention, the destination areas and points may be saved in association with a computer resource (e.g. a specific file), or as a named template. These insertion points and areas can then be recalled so that new information from multiple sources can be quickly and routinely compiled. This function is particularly useful for creating news letters, status reports, and the like.

As will be recognized by those skilled in the art, the use of text as the content copied from a source to a destination in the foregoing examples is not meant to imply that the present invention is limited to such content types. In fact, it may be used to transfer content of any format which is compatible with the transfer buffer implementation. For example, video clips, graphics, hyperlinks, audio clips, and the like may be handled by the invention provided that the transfer buffer is implemented in a manner compatible with storing such information.

Another desirable but not critical aspect of the invention is to provide an "undo" function, with or without an action log. By keeping track of the source to destination transfers, and especially the source deletions when "cutting" is selected, the user may reverse any operation previously made. The tracking record of actions taken can preferably be produced in a human readable form, which is useful in version tracking, revision control, and similar activities.

Compatibility Handling

Figure 6:
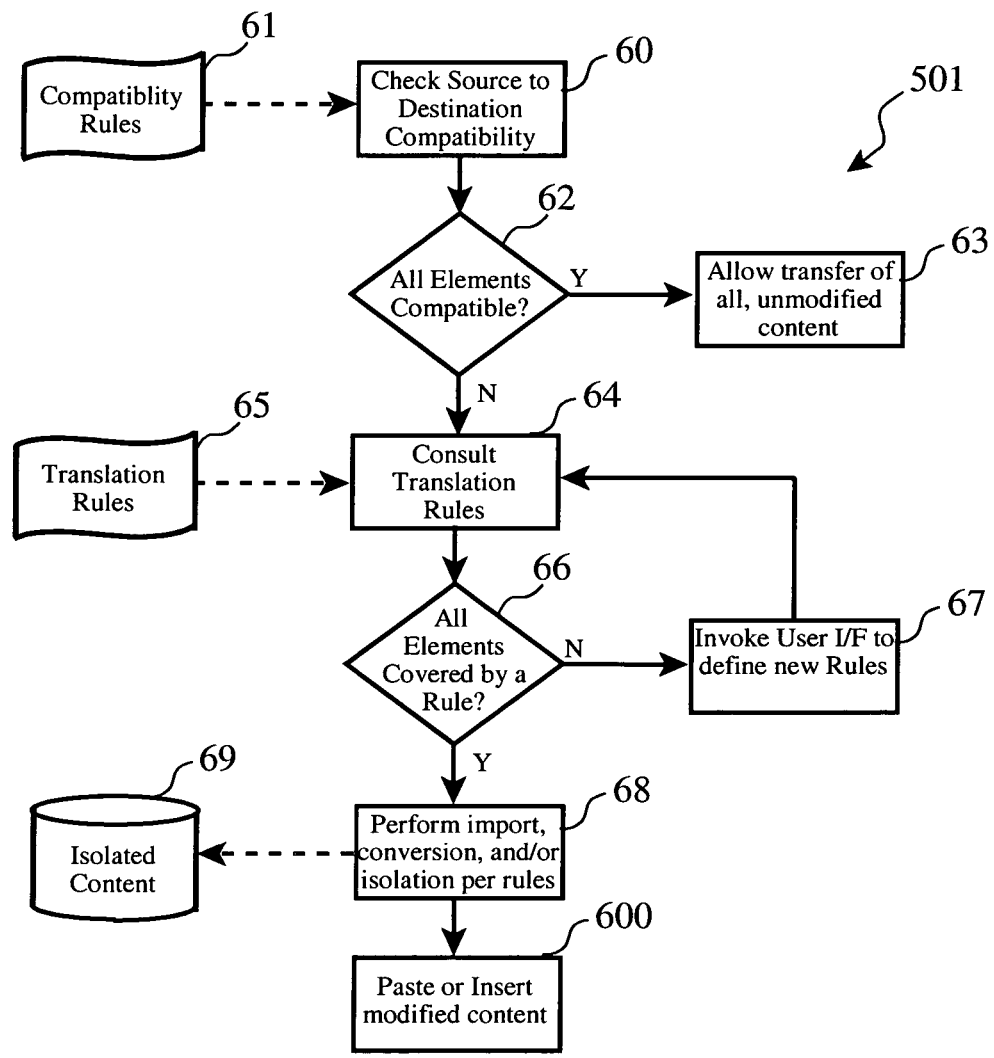
FIG. 6 depicts details of the logical process of handling incompatible elements of information.

Turning to FIG. 6, details of compatibility handling (501) according to the present invention are shown. A set of compatibility rules, if already defined, are consulted initially to determine (60) if all the elements of the selected source content are compatible with the destination. For example, Table 1 shows a basic set of compatibility rules which can be implemented in a text file for a particular hypothetical destination document editor called "JotPro". For this example, also assume that JotPro can receive plain text, richly formatted text (e.g. text with font, size, color and other attributes), Microsoft Windows™ text, ANSI text, ASCII text, as well as Tagged Interchange Format ("TIF") and Bit Map ("BMP") images, but not JPEG, GIF or Windows Metafile ("WMF") images. Also, our hypothetical word processor has its own native text format, JotText, and native image format JotPix. Further assume that JotPro documents can include hyperlinks.

TABLE 1

Example "JotPro" Compatibility Rules

```
<compatibility_rules>
    <destination> Jotpro </destination>
    <destination_versions> all </destination_versions>
    <text_compatibility>
        plain; ascii; ansi; MSWin; RTF; JotText
    </text_compatibility>
    <graphic_compatibility>
        tif; tiff; bmp; JotPix;
    </graphic_compatibility>
</compatibility_rules>
```

Table 1 is expressed in a markup-style language, such as eXtensible Markup Language ("XML"). Other formats and language are available to implement such as set of compatibility rules, including but not limited to plain text, macro languages, tables, databases, etc.

So, each element (e.g. paragraph or sentence of text, graphic image, video clip, audio clip, animation, etc.) is checked (60) the list of compatibility rules, and if it is not found to be compatible, it is marked for conversion. If (62) all elements are compatible, then transfer of the unmodified source content (all elements) is allowed (63).

For each incompatible element, a set of conversion rules (65) is consulted (64) to determine how to handle the element. Table 2 shows an example set of conversion rules expressed in a markup-style language.

TABLE 2

Example "JotPro" Conversion Rules

```
<conversion_rules>
    <destination> Jotpro </destination>
    <destination_versions> all </destination_versions>
    <rule>
        <element_source>"Lotus WordPro" </element_source>
        <element_type> text </element_type>
        <action> invoke WP2JP_text.exe </action>
    </rule>
    <rule>
        <element_source>"Lotus Presentation" </element_source>
        <element_type> vector graphics </element_type>
        <action> invoke WP2JP_graphics.exe </action>
    </rule>
    <rule>
        <element_source> all </element_source>
        <element_type> JPEG; JPG </element_type>
        <action> invoke JPG2JP_graphics.exe </action>
    </rule>
</conversion_rules>
```

In this example set of rules, text which is being pasted from the Lotus WordPro™ word processor's native format into JotPro will be first imported or converted using a program specified as "WP2JP_text.exe". Likewise, vector graphics being pasted from Lotus Presentation will be converted using a program specified as WP2JP_graphics.exe". Additionally, any graphics elements of the JPEG type (e.g. JPG or JPEG) will be converted using a program specified as "JPG2JP_graphics.exe". It is important to note that the example program names given here are hypothetical as well, and any other suitable macro, program, applet, servlet, or other suitable process name or handle can be used in their place.

If (66) no applicable rule for an incompatible element is found in the conversion rules (65), then a user interface is preferably invoked to allow the user to define a new rule or action for handling the type of incompatible element.

When conversion rules for all incompatible elements have been found or defined, the various actions or conversion operations are performed (68), such as importing, converting, or isolating an element. Importing and converting actions are performed when a translator or "import filter" is available which is capable of converting the incompatible element to a compatible element, such as converting rich text to proprietary text, or converting a graphics element from JPEG to GIF, etc.

Figure 7:
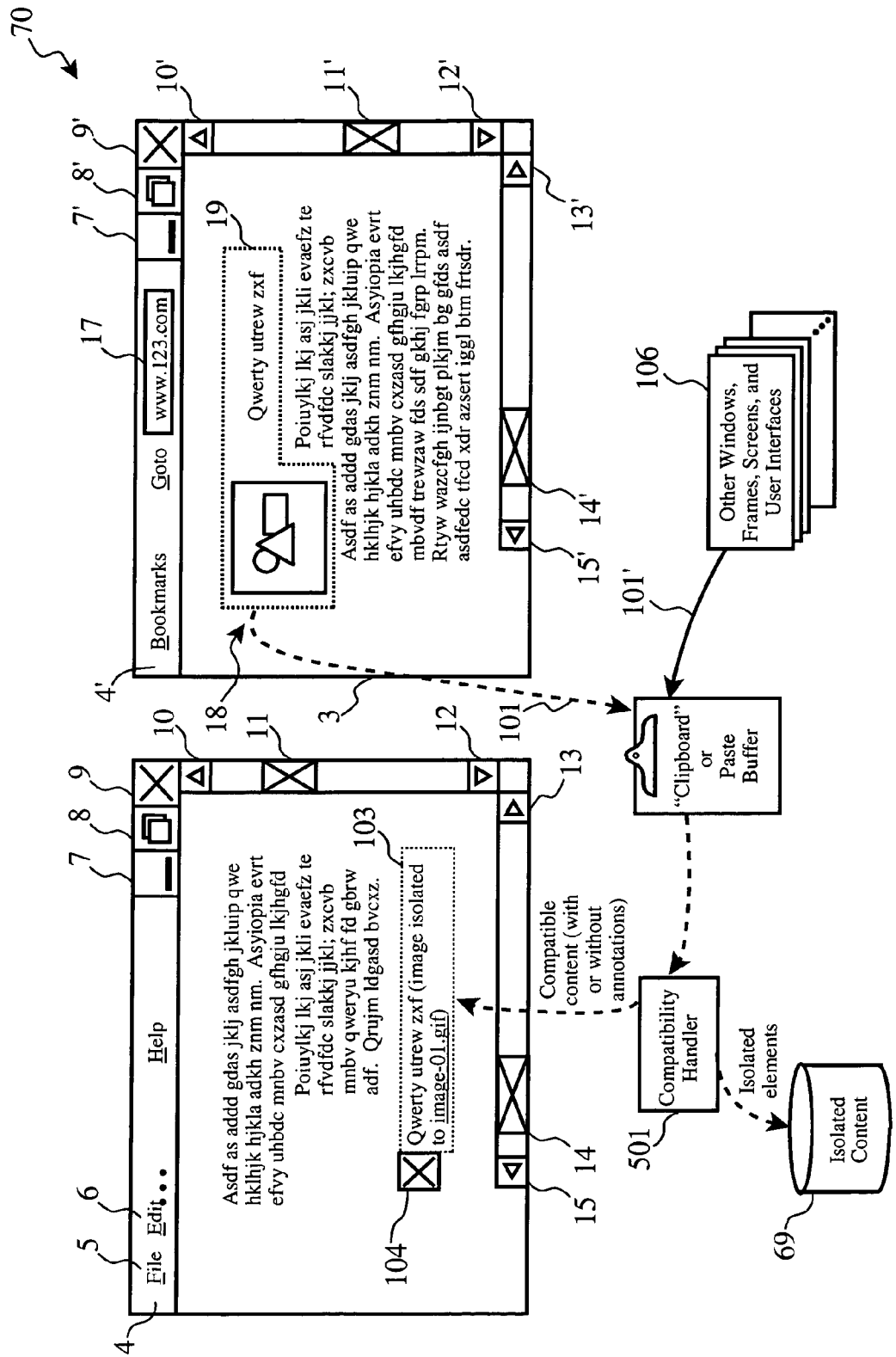
FIG. 7 shows an example of isolation of an incompatible element, in this case a graphic element.

Isolation is a special type of handling which allows incompatible elements to be "separated" from the source content and stored in a separate data construct, such as a file on the system hard drive, or a file in system memory. For example, FIG. 7 shows an isolation process wherein some example text "Qwerty utrew zxf" has been selected along with a graphic image (shown in the solid box), such as a GIF image. However, the compatibility handler has been configured to isolate this particular type of graphic image, so it is directed towards a file called "image-01.gif" stored as an isolated element (69), and only the compatible text "Qwerty utrew zxf" is transferred to the destination (103). Optionally and preferably, an annotation indicating the isolation and location of the incompatible element, as shown. Preferably, if the destination file can include hyperlinks, the annotation is a hyperlink to the actual isolated element, thereby allowing the user to easily and quickly find the isolated element.

Rule Management User Interface

As previously disclosed, when an element is encountered in the source content for which there is no compatibility rule or no conversion rule, a user interface is preferably invoked which allows a user to:

(a) define a new type of element for a given destination with which the destination is compatible;

(b) delete a type of element for which a given destination is incompatible (this allows a user to selectively block certain element types from transfer, and optionally invoke a conversion rule on that element);

(c) define a new conversion rule for a given element type and destination including simply blocking the transfer of the element, converting the element and transferring it, isolating the element, isolating the element and transferring an annotation, and isolating the element and transferring a hyperlinked annotation.

(d) modifying or deleting an existing conversion rule.

Well-known user interface elements, such as drop-down boxes, modifiable lists, browsing windows (for finding converters and executable translators), radio buttons, etc., can be used to realize such a user interface which creates, edits and manages the rules, such as those shown in Tables 1 and 2. The compatibility rules and the conversion rules may be stored separately, or together, according to the particulars of the alternative embodiment of the invention.

CONCLUSION

As such, the present invention may be realized in a variety of forms, programming languages, methodologies, and operating systems on a variety of computing platforms without departure from the spirit and scope of the present invention. A number of example embodiment details have been disclosed as well as optional aspects of the present invention in order to illustrate the invention, but which do not define the scope of the invention. Therefore, the scope of the present invention should be determined by the following claims.

What is claimed is:

1. A computer-implemented method comprising:
providing a copier configured to allow a user to designate a destination point or area in a first computer resource, and to select in a second user interface to a second computer resource multiple information elements in the second computer resource;
responsive to the user selections, automatically concatenating the multiple selected information elements into a single transfer buffer; and
automatically transferring the concatenated information elements from the transfer buffer, to the destination point or area of one or more information elements.

2. The computer-implemented method as set forth in claim 1:
wherein the providing of a copier comprises providing a destination-first, source-second element copier configured to allow a user in a first user interface to a first computer resource to designate a destination point or area in the first computer resource, and to subsequently select in a second user interface to a second computer resource two or more information elements in the second computer resource;
wherein the transfer buffer comprises a clipboard in memory;
wherein the concatenating further comprises, subsequent to the user selections, automatically copying the selected information elements into the clipboard in memory;
wherein the automatic transferring further comprises, upon attempt to automatically transfer the information elements from the clipboard in memory, intercepting the transfer to the destination point or area of one or more information elements;
and the method further comprising:
performing a compatibility check for each intercepted information element with the destination computer resource by consulting one or more user-configurable compatibility rules to classify elements as incompatible or compatible;
for each incompatible element, performing a compatibility handling action as defined by one or more conversion rules; and
for each compatible element, allowing transfer of the unmodified compatible element to the destination.

3. The method as set forth in claim 2 further comprising:
invoking a rule management user interface responsive to finding no existing compatibility rule for an element to be transferred; and
allowing, via the rule management user interface, a user action selected from a group comprising creating a new compatibility rule, deleting a compatibility rule, and modifying a compatibility rule.

4. The method as set forth in claim 2 further comprising:
invoking a rule management user interface responsive to finding no existing conversion rule for an element to be transferred; and
allowing, via the rule management user interface, a user action selected from a group comprising creating a new conversion rule, deleting a conversion rule, and modifying a conversion rule.

5. The method as set forth in claim 4 wherein the user action of creating and modifying a conversion rule comprises creating and modifying a conversion rule which specifies performing an action selected from a group comprising converting a text element from one format to another format, converting a graphic image element from one format to another format, converting a video clip element from one format to another format, converting an audio clip element from one format to another format, converting animated image element from one format to another format, isolating an element, isolating an element and transferring an annotation to the destination, isolating an element and transferring a hyperlinked annotation to the destination.

6. The method as set forth in claim 2 wherein the performing a compatibility handling action comprises performing an action selected from the a group comprising converting a text element from one format to another format, converting a graphic image element from one format to another format, converting a video clip element from one format to another format, converting an audio clip element from one format to another format, converting animated image element from one format to another format, isolating an element, isolating an element and transferring an annotation to the destination, isolating an element and transferring a hyperlinked annotation to the destination.

7. A computer-readable storage memory comprising:
a computer readable storage memory suitable for encoding computer programs; and
one or more computer programs encoded by the memory and configured to transfer content from one computer resource to another computer resource by:

providing a copier configured to allow a user to designate a destination point or area in a first computer resource, and to select in a second user interface to a second computer resource multiple information elements in the second computer resource;

responsive to the user selections, automatically concatenating the multiple selected information elements into a single transfer buffer; and automatically transferring the concatenated information elements from the transfer buffer to the destination point or area of one or more information elements.

8. The computer-readable memory as set forth in claim 7:
wherein the computer program providing of a copier comprises computer program providing a destination-first, source-second element copier configured to allow a user in a first user interface to a first computer resource to designate a destination point or area in the first computer resource, and to subsequently select in a second user interface to a second computer resource two or more information elements in the second computer resource;
wherein the transfer buffer comprises a clipboard in memory;
wherein the computer program concatenating further comprises, subsequent to the user selections, automatically copying the selected information elements into the clipboard in memory;
wherein the computer program automatically transferring further comprises, upon attempt to automatically transfer the information elements from the clipboard in memory, intercepting the transfer to the destination point or area of one or more information elements;
and the computer program further comprising:
performing a compatibility check for each intercepted information element with the destination computer resource by consulting one or more user-configurable compatibility rules to classify elements as incompatible or compatible;
for each incompatible element, performing a compatibility handling action as defined by one or more conversion rules; and
for each compatible element, allowing transfer of the unmodified compatible element to the destination.

9. The computer readable storage memory as set forth in claim 8 further comprising computer program configured to:
invoke a rule management user interface responsive to finding no existing compatibility rule for an element to be transferred; and
allow, via the rule management user interface, a user action selected from a group comprising creating a new compatibility rule, deleting a compatibility rule, and modifying a compatibility rule.

10. The computer readable storage memory as set forth in claim 8 further comprising computer program configured to:
invoke a rule management user interface responsive to finding no existing conversion rule for an element to be transferred; and
allow, via the rule management user interface, a user action selected from a group comprising creating a new conversion rule, deleting a conversion rule, and modifying a conversion rule.

11. The computer readable storage memory as set forth in claim 10 wherein creating and modifying a conversion rule comprises creating and modifying a conversion rule which specifies performing an action selected from a group comprising converting a text element from one format to another format, converting a graphic image element from one format to another format, converting a video clip element from one format to another format, converting an audio clip element from one format to another format, converting animated image element from one format to another format, isolating an element, isolating an element and transferring an annotation to the destination, isolating an element and transferring a hyperlinked annotation to the destination.

12. The computer readable storage memory as set forth in claim 8 wherein the performing a compatibility handling action comprises performing an action selected from a group comprising converting a text element from one format to another format, converting a graphic image element from one format to another format, converting a video clip element from one format to another format, converting an audio clip element from one format to another format, converting animated image element from one format to another format, isolating an element, isolating an element and transferring an annotation to the destination, isolating an element and transferring a hyperlinked annotation to the destination.

13. A system for automatically transferring content from one computer resource to another computer resource, the system having one or more circuits, one or more programs executed by a processor, or a combination of circuits and processor-executed programs comprising:
a single transfer buffer in a computer readable storage memory; and
an element copier:
allowing a user to designate a destination point or area in a first computer resource;
allowing a user to select in a second user interface to a second computer resource multiple information elements in a second computer resource;
automatically concatenating the multiple selected information elements into the single transfer buffer; and
automatically transferring the information elements from the single transfer buffer, to the destination point or area of one or more information elements.

14. The system as set forth in claim 13:
in which the transfer buffer comprises a clipboard in memory;
in which the copier comprises a destination-first, source-second element copier configured to allow a user in a first user interface to a first computer resource to designate a destination point or area in the first computer resource, to subsequently select in a second user interface to a second computer resource two or more information elements in the second computer resource, and to subsequently automatically copy the selected information elements into the clipboard in memory thereby concatenating the information elements into the clipboard;
and further comprising:
a transfer interceptor configured to, upon attempt to copy the information elements from the clipboard, intercept one or more information elements;
a compatibility checker configured to verify the compatibility of each intercepted information element with the destination by consulting one or more user-configurable compatibility rules to classify elements as incompatible or compatible; and
a compatibility action handler configured to perform an action as defined by one or more conversion rules for each intercepted information element, and further configured to allowing transfer of the compatible elements to the destination without modification.

15. The system as set forth in claim 14 further comprising:
a rule management user interface, invoked in response to finding no existing compatibility rule for an element to be transferred; and one or more user options provided via the rule management user interface, for selecting a compatibility rule management action from a group comprising creating a new compatibility rule, deleting a compatibility rule, and modifying a compatibility rule.

16. The system as set forth in claim 14 further comprising:
a rule management user interface, invoked in response to finding no existing conversion rule for an element to be transferred; and
one or more user options provided via the rule management user interface, for selecting a user action from a group comprising creating a new conversion rule, deleting a conversion rule, and modifying a conversion rule.

17. The system as set forth in claim 16 wherein the user action group comprises at least one action selected from a group comprising creating and modifying a conversion rule which specifies performing an action selected from the group of converting a text element from one format to another format, converting a graphic image element from one format to another format, converting a video clip element from one format to another format, converting an audio clip element from one format to another format, converting animated image element from one format to another format, isolating an element, isolating an element and transferring an annotation to the destination, isolating an element and transferring a hyperlinked annotation to the destination.

18. The system as set forth in claim 14 wherein the compatibility action handler is further configured to perform an action selected from a group comprising converting a text element from one format to another format, converting a graphic image element from one format to another format, converting a video clip element from one format to another format, converting an audio clip element from one format to another format, converting animated image element from one format to another format, isolating an element, isolating an element and transferring an annotation to the destination, isolating an element and transferring a hyperlinked annotation to the destination.

* * * * *

UNITED STATES PATENT AND TRADEMARK OFFICE
CERTIFICATE OF CORRECTION

| | |
|---|---|
| PATENT NO. | : 8,689,125 B2 |
| APPLICATION NO. | : 10/692173 |
| DATED | : April 1, 2014 |
| INVENTOR(S) | : Yen-Fu Chen et al. |

It is certified that error appears in the above-identified patent and that said Letters Patent is hereby corrected as shown below:

Item (56) References Cited:

Title Page 2, Column 2, Other Publications, Line 32, "Syncrhonizing" should be "Synchronizing"

Title Page 2, Column 2, Other Publications, Line 37, "FPT" should be "FTP"

Signed and Sealed this
Seventeenth Day of June, 2014

Michelle K. Lee
*Deputy Director of the United States Patent and Trademark Office*